March 4, 1952     F. F. DAUENHAUER     2,587,604
TRAVELING MESH CLUSTER PICKER, LEAF AND STEM SEPARATOR
Filed Jan. 3, 1948     4 Sheets-Sheet 4

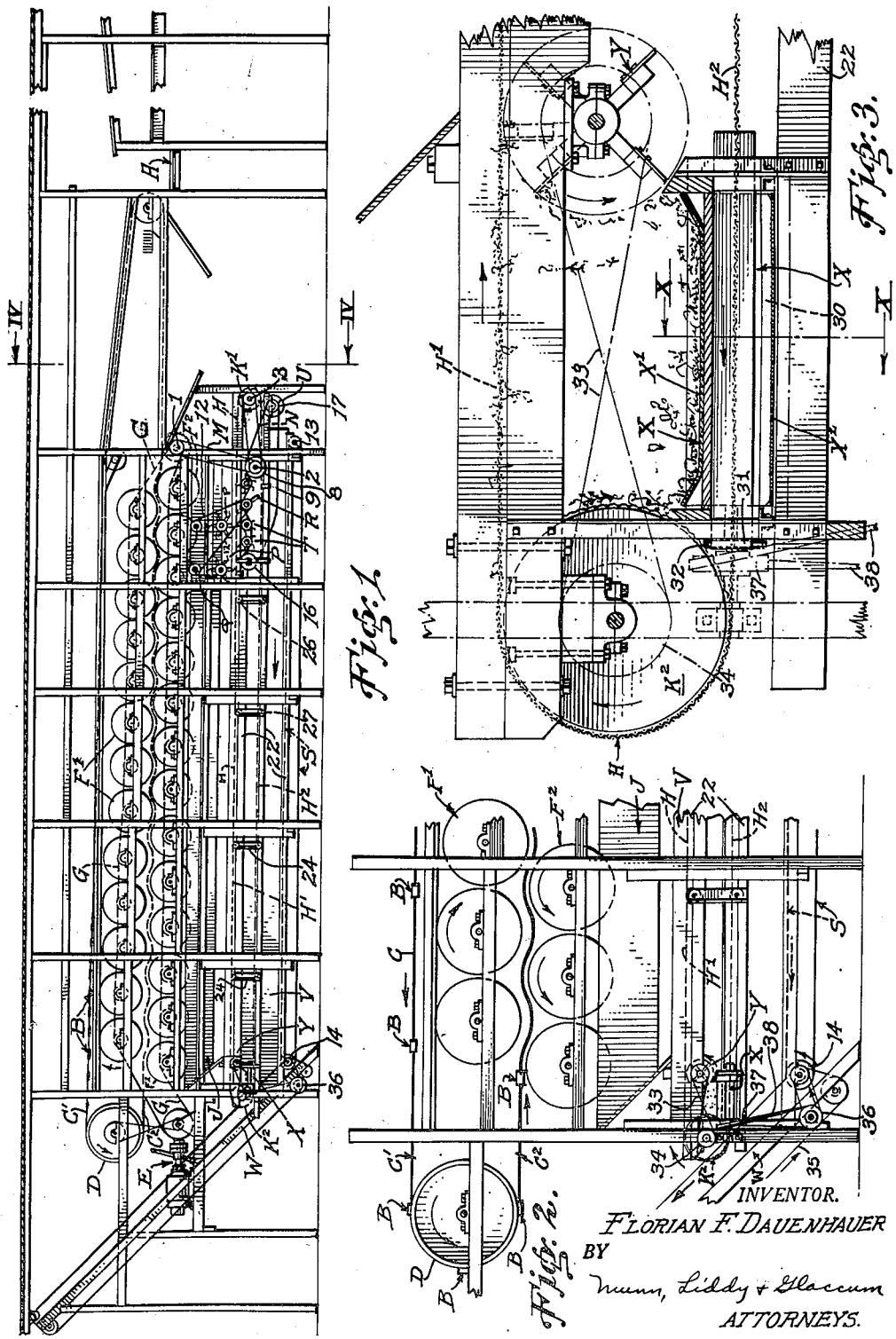

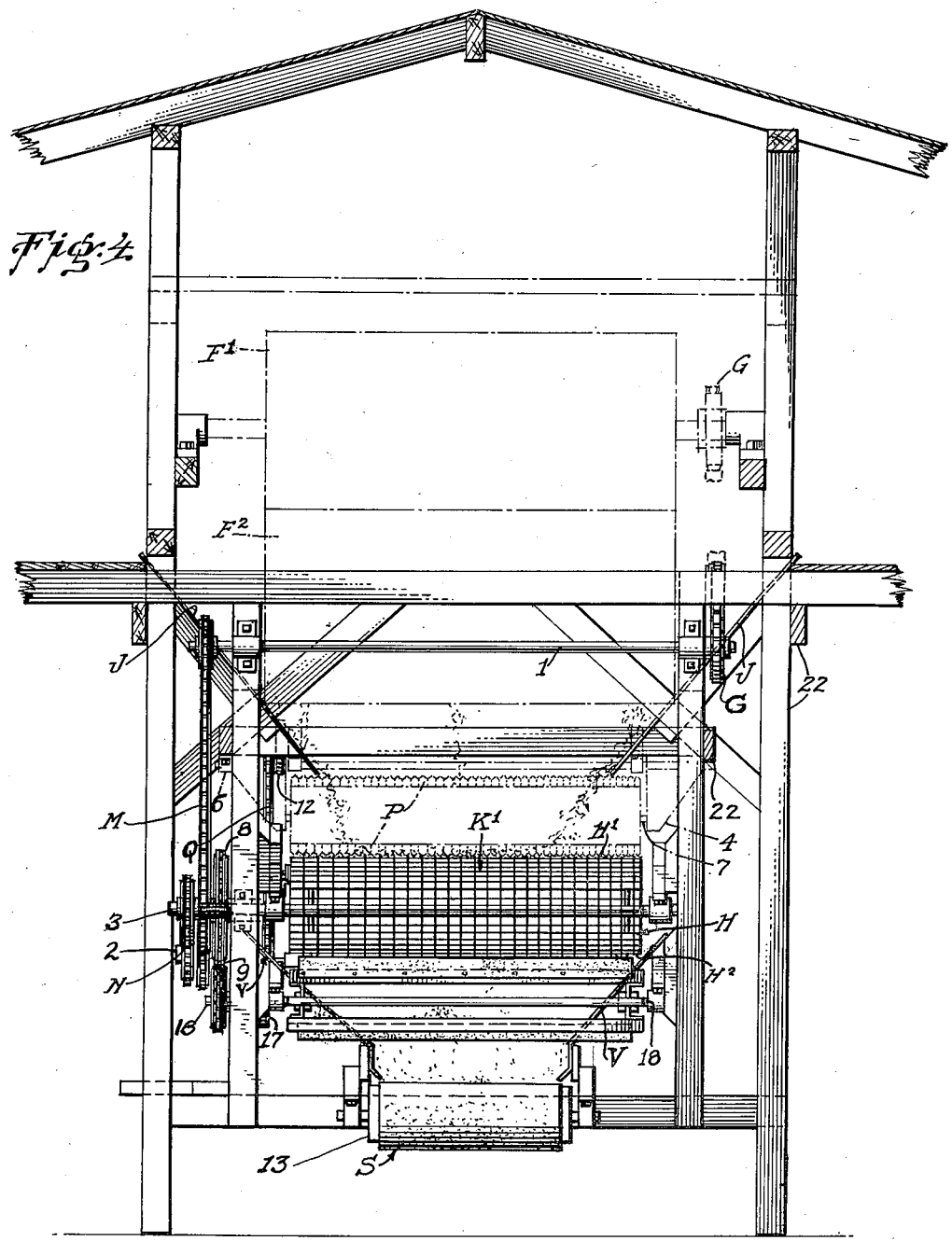

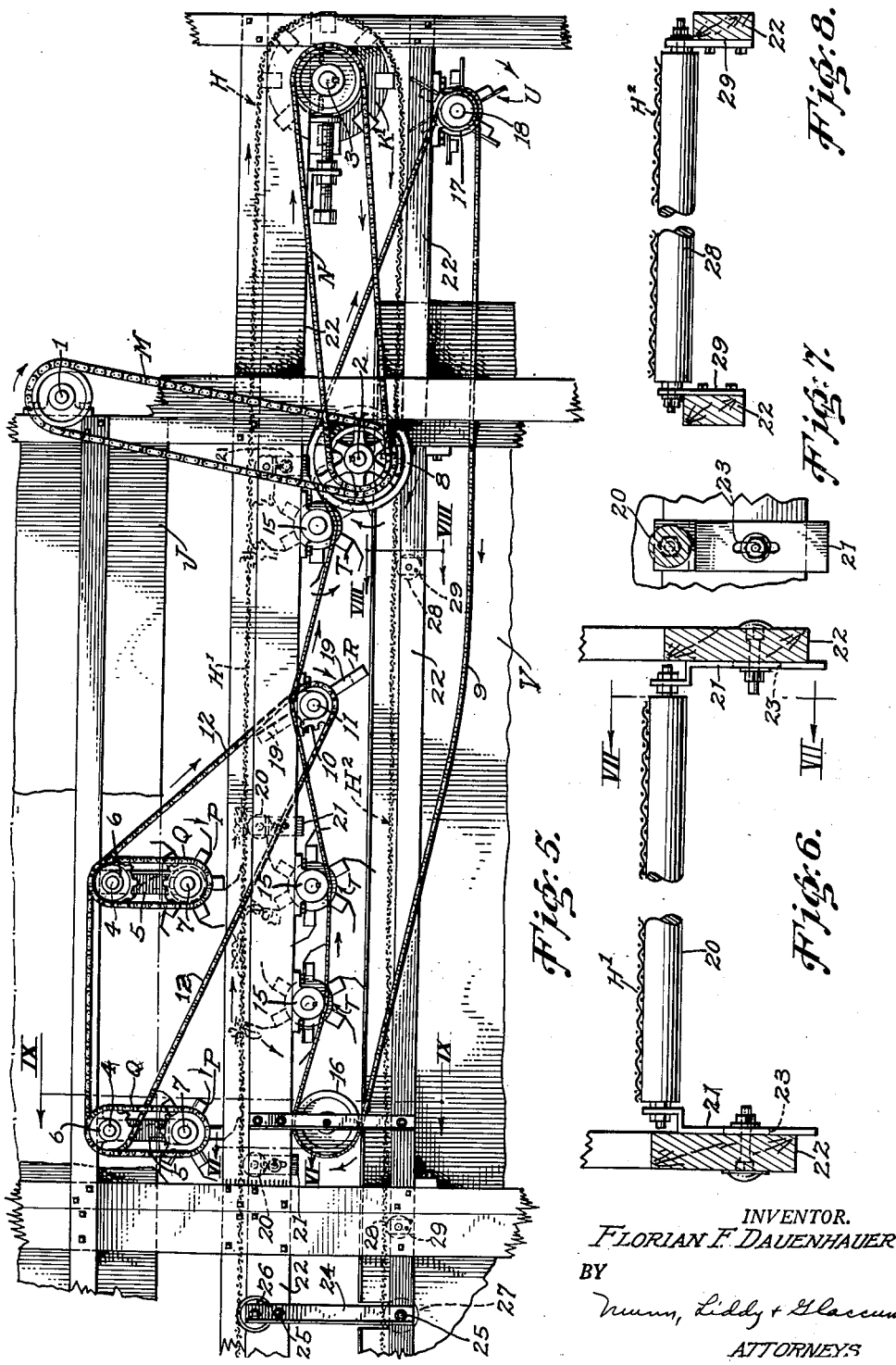

INVENTOR.
FLORIAN F. DAUENHAUER
BY Munn, Liddy & Daccum
ATTORNEYS.

Patented Mar. 4, 1952

2,587,604

UNITED STATES PATENT OFFICE 2,587,604

TRAVELING MESH CLUSTER PICKER, LEAF AND STEM SEPARATOR

Florian F. Dauenhauer, Santa Rosa, Calif.

Application January 3, 1948, Serial No. 405

4 Claims. (Cl. 130—30)

An object of my invention is to provide a traveling mesh cluster picker, leaf and stem separator for a stationary type hop picking machine of the type shown in my Reissue Patent No. 22,889, reissued June 17, 1947. In the reissue patent I show a hop picking machine in which the picking of the hops is continuous throughout the length of the passage through which the vines are moved, the passage being undulating in shape and of uniform depth throughout. A more complete picking of the hops results and there is less breakage of the vines since the vines are carried through a passage of uniform depth rather than through one where the depth varies.

In the hop picking machine shown in my reissue patent, the hops fall from the picker drums onto a series of grizzly bars, not shown in the patent, these bars being disposed at an angle and overlying the hop conveying belt. The grizzly extends the full length of the machine and its purpose is to prevent hop clusters and broken vine portions from dropping onto the hop conveyor belt. It requires approximately fifteen people to pick the hops from the clusters and to work the hops through the bars of the grizzly so that they will fall onto the hop conveyor belt.

The principal object of my present invention is to eliminate this labor expense. I provide a traveling mesh belt and position it under the hop picking drums and above the hop-receiving belt. The mesh of the belt is large enough to permit hops to pass therethrough and on to the hop conveying belt. The hop clusters and broken branches will be caught by the traveling belt and carried to a plurality of auxiliary hop picking drums where the hops are removed from the clusters and will drop onto the hop conveying belt. Novel means is provided for carrying away the broken branches from the machine.

Other objects and advantages will appear in the following specification, and the novel features of the device will be particularly pointed out in the appended claims.

My invention is illustrated in the accompanying drawings forming a part of this application, in which:

Figure 1 is a schematic side elevation of a hop picking machine showing my device operatively applied thereto;

Figure 2 is an enlarged elevation of a rear portion of the machine shown in Figure 1, and shows a portion of my device on an enlarged scale;

Figure 3 is a further enlarged showing of a part of my device illustrated in Figure 2;

Figure 4 is an enlarged transverse section taken along the line IV—IV of Figure 1;

Figure 5 is an enlarged view of the front portion of the machine showing another portion of my device on a larger scale;

Figure 6 is an enlarged transverse section taken along the line VI—VI of Figure 5, and illustrates an adjustable roller supporting the upper reach of a screen belt;

Figure 7 is a section taken along the line VII—VII of Figure 6;

Figure 8 is an enlarged transverse section taken along the line VIII—VIII of Figure 5, and illustrates a fixed roller supporting the lower reach of the screen belt;

Figure 9:
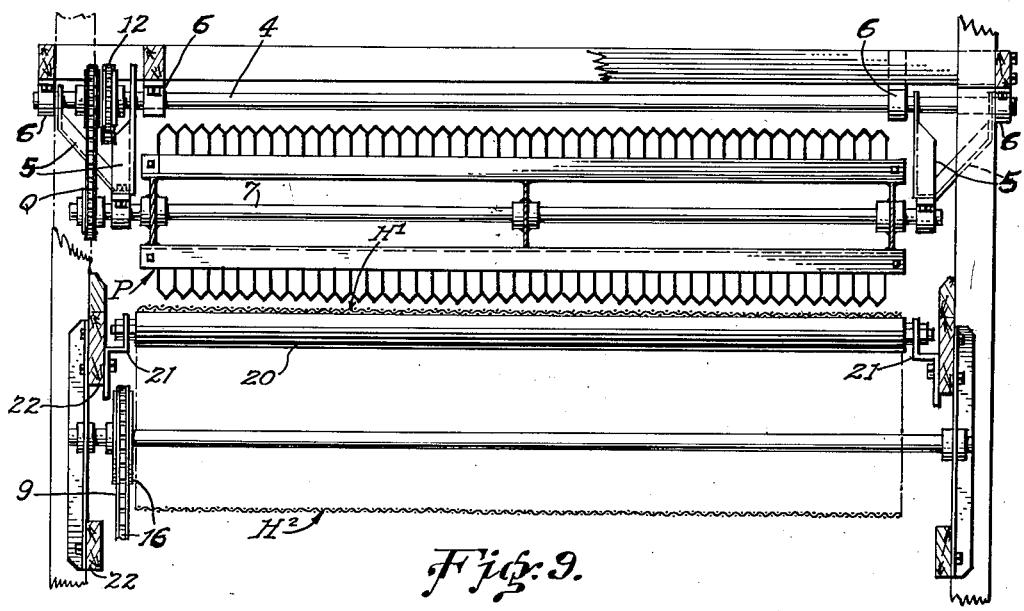
Figure 9 is a transverse section taken along the line IX—IX of Figure 5, and illustrates the swinging hop picking drums that are associated with the upper reach of the screen belt.

While I have shown only the preferred form of my invention, it should be understood that various changes or modifications may be made within the scope of the appended claims without departing from the spirit and scope of the invention.

In carrying out my invention, I show the stationary type hop picking machine diagrammatically in Figure 1. The hop vines are delivered to a loading platform indicated generally at A where operators connect the vine stems to grasper bars indicated generally at B in Figures 1 and 2, the ends of the bars being connected to endless cables C. The cables are passed around drive pulleys D placed at the rear of the machine in Figure 1 and actuated by a power unit indicated generally at E. The upper reaches C1 of the cables extend over a plurality of hop picker drums F1 and the lower reaches C2 of the cables extend between the upper row of picker drums F1 and a lower row of picker drums F2. Any operating mechanism for rotating the upper row of picker drums clockwise and for rotating the lower row of picker drums counter-clockwise may be used, and I have indicated one such mechanism at G. This mechanism includes an endless chain operated by the power unit E, the chain passing over sprockets which are mounted on the shafts that carry the hop picking drums. The drums F2 in the lower row are staggered with respect to the drums F1 in the upper row as clearly shown in Figure 1, and the distance between the drums in the upper row and the drums in the lower row is gradually reduced from the rear end of the machine to the front end of the machine. This structure is similar to that set forth in my patent above mentioned.

The vines containing the hops when attached to the grasper bars are pulled the entire length of the machine over the tops of the upper row of hop picking drums F1 and then are returned between the upper and lower rows of drums. Since the drums in the lower row F2 are staggered with respect to those in the upper row, an undulating path for the vines is formed between the rows of drums. The vine passage between the rows of drums is gradually reduced in depth from the rear end of the machine to the front end so that the hop picking drums can remove all of the hops from the vines. The particular type of hop picking drum used is shown in my patent above mentioned.

My improvement in the present invention comprises an endless screen belt H that extends from the front to the rear of the machine and has its upper reach H1 disposed under the lowermost row of picker drum F2. Figure 4 illustrates how the machine is provided with an upper hopper J that has inclined sides for directing the picked hops on to the upper reach H1 of the endless screen mesh. During the picking operation performed by the hop picking drums F1 and F2, broken branches, stems and hop clusters are torn loose from the hop vines and will drop upon the upper reach H1 of the screen belt H. In Figure 5 I show the upper reach H1 moving toward the front of the machine.

A drum K1 is placed at the front of the machine and the screen mesh belt is passed around this drum. Figure 2 shows the rear loop portion of the screen belt H passed around a rear drum K2. Any means for driving the belt may be used and I show in Figures 1 and 5 an upper jack shaft 1 that is rotated by means of the chain forming a part of the drum rotating mechanism G. It is possible to have the chain also passed around a sprocket on the jack shaft 1 for rotating the shaft in a clockwise direction when looking at Figure 1.

Again referring to Figure 5, I show the shaft 1 operatively connected to a lower jack shaft 2 by means of a chain and sprocket M. Another chain and sprocket N interconnects the lower jack shaft 2 with a shaft 3 on which the front drum K1 is mounted. By this arrangement the screen mesh belt H is moved so that its upper reach H1 travels from the rear to the front of the machine and its lower reach H2 travels from the front to the rear of the machine. Any broken branches or hop clusters that may be torn from vines by the hop picking drums will drop onto the upper reach H1 and will be moved toward the front of the machine. The particular type of endless screen used is the same as that shown in my copending application, Serial No. 575,374, filed January 31, 1945, now abandoned. The mesh is large enough to permit hops to pass therethrough, but will prevent branches or hop clusters from passing therethrough. Some of the hop clusters may remain upon the upper surface of the reach H1 and other hop clusters may have their hops extend through the mesh of the reach H1 while the stems of the clusters still remain on the upper surface. I provide novel means for removing the hops that might lie on the upper surface of the reach H1 and also provide novel means for removing any hops that might hang through the mesh. I will describe the means for removing the hops from the top of the reach H1 first and Figure 5 illustrates the mechanism used.

I provided a plurality of transversely extending shafts 4 and on these shafts I suspend arms 5 that are free to swing about the shafts as centers. The shafts 4 are carried by bearings 6 and these bearings are secured to the frame of the lowermost row of picker drums F2 and toward the front of the machine. The free ends of the arms 5 carry hop picking drums indicated generally at P and these drums can be referred to as the swing type of hop picking drums, because they are rotatably carried by the free ends of the arms 5 and can swing about the shafts 4 as centers. Sprocket and chain mechanisms Q interconnect the shafts 4 with shafts 7 so that a rotation of the shafts 4 will rotate the shafts 7 and the swinging hop picking drums P.

Figures 4 and 5 also show a large sprocket 8 mounted on the lower jack shaft 2 and a sprocket chain 9 extends from this sprocket to a sprocket 10 that is mounted on a shaft 11 which in turn carries a beater R which will be described hereinafter. Another sprocket similar to the sprocket 10 and mounted on the same shaft 11 has a sprocket chain 12 that extends to sprockets that are mounted on the shafts 4. The movement of the chain 12 is such as to cause the shafts 4 and the hop picking drums P to rotate in a clockwise direction when looking at Figure 5. The hop picking drums will engage with any hop clusters on the upper surface of the upper reach H1 and will remove hops from these clusters, the hops dropping through the mesh of the upper and lower reaches and dropping on to the hop conveying belt S. The hop conveying belt S is shown in Figure 1 as being supported by drums 13 and 14, the drum 13 being placed at the front of the machine and the drum 14 at the rear of the machine.

Under the upper reach H1 of the endless screen belt H, I mount a plurality of auxiliary hop picking drums indicated generally at T. One of the picking drums is placed in front of the beater R and two more are placed in back of the beater and substantially under the swinging type auxiliary hop picking drums P. I do not wish to be confined to any exact number of hop picking drums. The sprocket chain 9 is passed around sprockets 15 that are mounted on the shafts of the hop picking drums T and the movement of the chain is such as to rotate the drums T in a counter-clockwise direction when looking at Figure 5. The chain 9 derives its power from being passed over the large sprocket 8 mounted on the lower jack shaft 2.

The chain is also passed around an idler sprocket 16 and a sprocket 17 that is mounted on a shaft 18 which in turn carries a beater indicated generally at U. The beater U is placed at the front of the machine and is positioned under the lower reach H2 of the screen mesh H. The beater has a number of paddles and it is rotated in a clockwise direction when looking at Figure 5 to clear the outer surface of the screen mesh H from any material that might cling to this surface after it passes around the front drum K1. In other words, any hop clusters dropping upon the upper reach H1 will have the hops removed therefrom by the swinging auxiliary hop pickers P and then the leaves or branches remaining on top of the screen will be ejected therefrom as the screen passes around the front drum K1. The beater U is for the purpose of making sure that all of the material on the outer surface of the screen will be removed so as to effectively clean this surface.

The auxiliary hop picking drums T are designed to remove any hops from clusters that might hang through the meshes of the upper screen reach H1 and these hops will drop upon the lower screen mesh reach H2 and will pass through the mesh of the screen and gravitate to the hop conveying belt S. Reference to Figure 4 shows how a lower hopper V is placed under the screen mesh H and will convey the hops to the hop conveying belt S. Figure 1 indicates how the upper reach of the belt S travels from the front to the back of the machine so as to convey the hops to an elevator indicated generally at W. The hop conveying belt S is placed in the center of the machine as shown in Figure 4.

In order to aid in removing hops from any clusters that may hang through the mesh of the upper reach, I provide the beater R that rotates in a clockwise direction and has arms 19 that will strike the upper reach H1 to agitate it. The striking of the upper reach will act to separate the bunches of hops so that the auxiliary hop picking drums T can remove these hops.

I provide novel means for supporting the upper reach of the screen mesh H. This comprises a plurality of adjustable rollers shown in Figures 5 and 6. The rollers 20 are rotatably carried by brackets 21, which in turn are adjustably supported by frame members 22 of the main frame. The brackets 21 have slots 23 therein for permitting vertical adjustment of the rollers 20. In this way the level of the upper reach H1 can be adjusted with respect to the beater R and the auxiliary hop picking drums P and T.

Figures 11, 12:
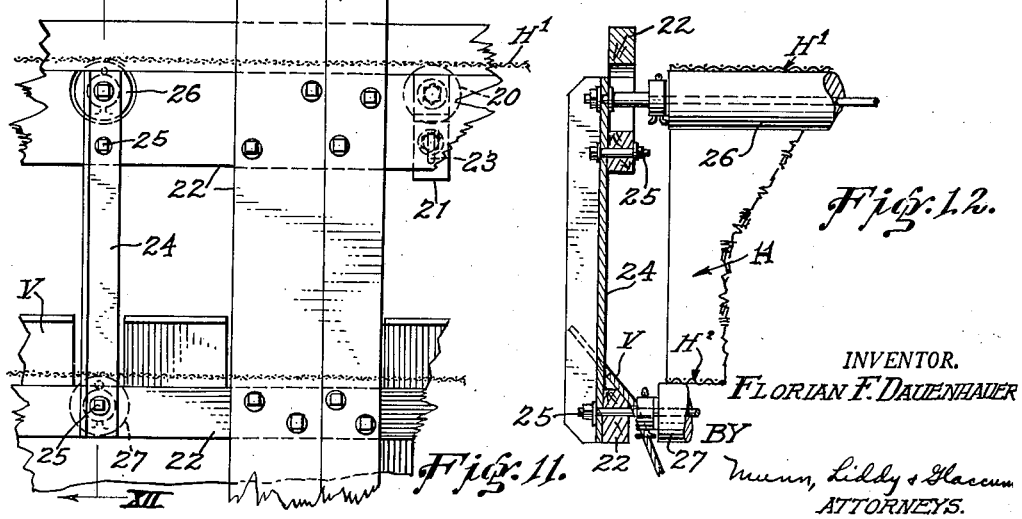
Figure 11 is an enlarged side elevation of a pair of upper and lower rollers for maintaining a predetermined spacing between the upper and lower reaches of the mesh belt.
Figure 12 is a transverse section taken along the line XII—XII of Figure 11.

I also provide novel means for spacing the lower reach H2 of the screen mesh a predetermined distance from the upper reach H1. This is shown in Figures 5, 11 and 12. Elongated brackets 24 are secured to the frame members 22 by bolts 25, or other suitable fastening means. Rollers 26, similar to the rollers 20 are rotatably carried by the upper ends of the elongated brackets 24 and support the upper reach H1. Lower rollers 27 are mounted at the lower ends of the brackets 24 and support the lower reach H2. In this way a predetermined distance is maintained between the upper and lower reaches of the endless screen belt H. Figure 1 shows a plurality of the elongated brackets 24 arranged at spaced intervals along the mesh. Figure 5 shows additional adjustable brackets 21 and these brackets are arranged adjacent to the auxiliary picker drums P and T so that the upper screen mesh H1 can be placed at the desired position between these drums. Figure 5 also discloses one of the adjustable brackets 21 placed adjacent to the front picker drum T.

In Figures 5 and 8, I show a plurality of fixed rollers 28 that will support the lower reach H2. The lower rollers 28 are rotatably carried by brackets 29. These in turn are secured to the frame members 22. Figure 5 illustrates two of the fixed lower rollers 28.

Figure 10:
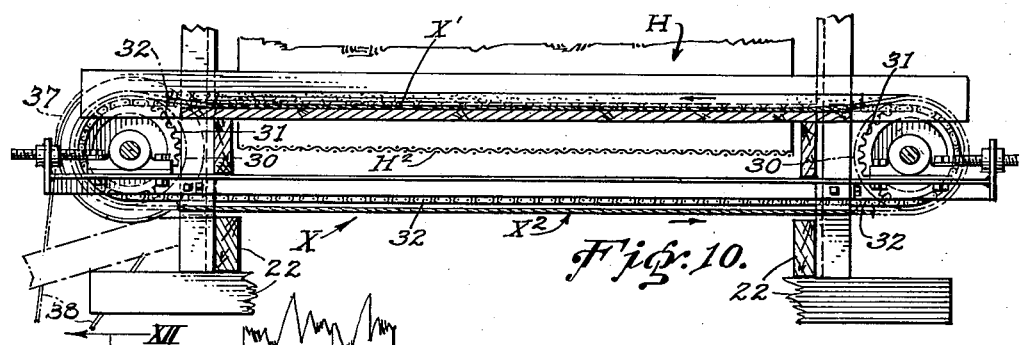
Figure 10 is a transverse section taken along the line X—X of Figure 3 and shows a transverse conveyor.

I provide novel means for removing any leaves or branches that might drop on to the upper surface of the lower reach H2 or that might depend from the upper reach H1 and be carried around the drum K1 between the drum and the screen mesh so as to appear on the upper surface of the lower reach as this portion of the screen belt travels from the front drum K1 to the rear drum K2. Reference to Figures 1, 2 and 3 shows the lower reach H2 passing around the rear drum K2. Any leaves or branches resting on the upper surface of the lower reach will travel between this surface and the adjacent surface of the rear drum K2. This material will drop off from the rear drum K2 and on to the upper reach of a transverse belt conveyor indicated generally at X in Figures 3 and 10. The transverse conveyor is mounted on drums 30 and Figure 10 illustrates how the drums may be rotated by sprockets 31 which are interconnected by a sprocket chain 32. The upper reach X1 of the transverse belt passes above the lower reach H2 of the screen belt while the lower reach X2 of the transverse belt passes under the lower reach H2. This arrangement is clearly shown in both Figures 3 and 10.

A beater indicated generally at Y in Figure 3 is placed at the right hand side of the upper reach X1 when looking at Figure 3 and this beater is connected by a crossed belt 33 to a pulley 34 that is rotated by the rear drum K2. This will cause the beater Y to rotate counterclockwise when looking at Figure 3 and remove any material that might be suspended from the upper reach H1 of the screen belt. By this arrangement the under surface of the upper reach H1 is cleaned and is ready to receive any hop clusters or broken branches that might drop from the picker drums F1 and F2.

Any means for rotating the transverse conveyor X may be used and I have shown this mechanism operated by the following mechanism. A belt or sprocket chain 35, see Figure 2, rotates the rear drum 14 of the hop conveyor belt S. The rear drum 14 is operatively connected to a pulley 36. The pulley 36 in turn is operatively connected to another pulley 37 by a belt 38. The pulley 37 is mounted on the same shaft as one of the sprockets 31. It is obvious that the pulleys and belts might be changed to chain and sprockets if it is found desirable. The pulley 36 is also operatively connected to the elevator W that receives the hops from the belt S.

From the foregoing description of the various parts of the device, the operation thereof may be readily understood.

The hop vines when attached to the grasper bars are first pulled over the tops of the upper row of hop picking drums F1 and then are moved through the undulating path provided between the upper and lower hop picking drums F1 and F2. These drums will remove the hops and the undulating path is gradually lessened in depth from the rear to the front of the machine so that the hop picking fingers on the drums will contact with all of the hops to remove them from the vines. These hops will drop through the mesh of the screen belt H and be guided by the upper and lower hoppers J and V, respectively, to the hop conveying belt S, which in turn will deliver them to the elevator W.

Any hop clusters, broken branches or leaves that are removed by the hop picking drums F1 and F2 will drop upon the upper reach H1 of the endless mesh H and will be conveyed toward the front of the machine. Here the swinging hop picking drums P will remove any hops that lie on top of the upper reach and the auxiliary hop picking drums T will remove any hops hanging through the mesh of the upper reach. The beater R will agitate the portion of the upper reach H1 passing between the swinging hop picking drums P and the auxiliary stationary hop picking drums T. All of the material on top of the upper reach after passing the swinging hop picking drums P will be ejected from the mesh as the screen passes around the front drum K1. All hops removed by the auxiliary drums P and T will drop to the hop conveying belt S. The beater U will clean the outer surface of the screen belt as it leaves the front drum.

Any material remaining on the upper surface of the lower reach H2 will be conveyed to the rear of the machine and will be carried around between the drum K2 and the mesh. This material will be deposited upon the upper reach X1 of the transverse conveyor belt X. The beater Y will cooperate to remove any material clinging to the under surface of the upper reach H1. The transverse conveyor X will carry the material to the side of the mesh and eject it. By this arrangement all of the hops will be automatically removed from hop clusters and the broken branches and other debris will be ejected from the machine.

I claim:

1. In a hop-picking machine: an endless screen guided to have upper and lower active sifting reaches, and defining an unobstructed material-dropping space extending between the reaches; the upper reach being adapted for receiving separated hops, broken branches, leaves and clusters of hops broken off from hop vines; the mesh of the screen being large enough for passage of the separated hops through both reaches of the screen by gravity, while preventing passage of broken branches and hop clusters through the mesh; means for imparting rotary movement to the screen; driven finger picker drums rotating in directions counter to movement of the upper screen reach, and cooperating with this screen reach for snapping hops from the clusters caught by the screen; and driven beaters engaging with inner and outer surfaces of the screen to positively clear the remaining hop-vine material from the screen.

2. In a hop-picking machine: an endless screen guided to have upper and lower active sifting reaches, and defining an unobstructed material-dropping space extending between the reaches; the upper reach being adapted for receiving separated hops, broken branches, leaves and clusters of hops broken from hop vines; the screen having a mesh large enough for passage of separated hops through both reaches of the screen, while preventing passage of the broken branches and hop clusters through the mesh; means for rotating the screen; driven finger picker drums rotating in directions counter to movement of the upper screen reach, and arranged above and below this screen reach for snapping hops from the clusters supported by this reach as the screen is moved; a driven beater having arms arranged to strike the underneath surface of the upper reach with impacts to separate bunches of hop clusters and present them for more ready picking of hops by the finger drums; and driven beaters engaging with the inner and outer surfaces of the screen to positively clear the remaining hop-vine material from the screen.

3. In a hop-picking machine: an endless screen guided to have upper and lower active sifting reaches, and defining an unobstructed material-dropping space extending between the reaches; the upper reach being adapted for receiving separated hops, broken branches, leaves and clusters of hops broken from hop vines; the screen having a mesh large enough for passage of separated hops through both reaches of the screen, while preventing passage of the broken branches and hop clusters through the mesh; means for rotating the screen; driven picker drums rotating in directions counter to movement of the upper screen reach, and arranged above and below this screen reach for snapping hops from the clusters supported by this reach as the screen is moved; driven beaters engaging with the inner and outer surfaces of the screen to positively clear the remaining hop-vine material from the screen; and means for removing any hop-vine material that might drop onto the upper surface of the lower screen reach, and convey this material out from between the reaches to preclude the lower reach from becoming jammed with the material.

4. In a hop-picking machine: an endless screen guided to have upper and lower reaches; the upper reach being adapted for receiving separated hops, broken branches, leaves and clusters of hops broken from hop vines; means for supporting and rotating the screen, including an end drum over which the screen is trained; the drum being disposed at the end of the screen where the lower reach moves into the upper reach; a transverse conveyor extending between the reaches and positioned adjacent to the downwardly-moving face of the drum, with the drum arranged on one side of the transverse conveyor; the transverse conveyor being positioned to receive hop-vine material that has dropped onto the upper surface of the lower reach of screen and has been carried upwardly between the screen and the drum face for discharge upon the transverse conveyor; means for operating the transverse conveyor for discharging any material received by it; a rotatable beater placed on the other side of the conveyor from the drum, and contacting with the underneath surface of the screen upper reach; and means for rotating the beater in a direction counter to movement of the upper screen reach to remove material still clinging to the underneath surface of this screen reach and impel this material into the transverse conveyor for discharge.

FLORIAN F. DAUENHAUER.

REFERENCES CITED

The following references are of record in the file of this patent:

UNITED STATES PATENTS

| Number | Name | Date |
| --- | --- | --- |
| 566,173 | Hemingway | Aug. 18, 1896 |
| 968,001 | Trowbridge | Aug. 23, 1910 |
| 1,008,914 | Horst | Nov. 14, 1911 |
| 1,054,119 | Horst | Feb. 25, 1913 |
| 1,054,551 | Horst | Feb. 25, 1913 |
| 1,241,883 | Rice | Oct. 2, 1917 |
| 1,868,356 | Helenbolt | July 19, 1932 |
| 2,187,526 | Thys | Jan. 16, 1940 |
| 2,222,767 | Gray | Nov. 26, 1940 |
| 2,226,813 | Gray | Dec. 31, 1940 |
| 2,335,417 | Huston | Nov. 30, 1943 |

FOREIGN PATENTS

| Number | Country | Date |
| --- | --- | --- |
| 516,822 | Great Britain | Jan. 12, 1940 |
| 576,059 | Great Britain | Mar. 18, 1946 |